(12) United States Patent
Southcombe et al.

(10) Patent No.: US 10,970,243 B2
(45) Date of Patent: Apr. 6, 2021

(54) FRONT END SERIAL BUS AUTOMATIC BUS PARK TRI-STATE ACTIVATION

(71) Applicant: Qorvo US, Inc., Greensboro, NC (US)

(72) Inventors: William David Southcombe, San Diego, CA (US); Christopher Truong Ngo, Queen Creek, AZ (US)

(73) Assignee: Qorvo US, Inc., Greensboro, NC (US)

( * ) Notice: Subject to any disclaimer, the term of this patent is extended or adjusted under 35 U.S.C. 154(b) by 116 days.

(21) Appl. No.: 15/419,550

(22) Filed: Jan. 30, 2017

(65) Prior Publication Data

US 2017/0220503 A1    Aug. 3, 2017

Related U.S. Application Data

(60) Provisional application No. 62/288,848, filed on Jan. 29, 2016.

(51) Int. Cl.
*G06F 13/364* (2006.01)
*G06F 13/42* (2006.01)
*G06F 13/40* (2006.01)

(52) U.S. Cl.
CPC .......... *G06F 13/364* (2013.01); *G06F 13/404* (2013.01); *G06F 13/4282* (2013.01)

(58) Field of Classification Search
CPC ... G06F 13/364; G06F 13/404; G06F 13/4282
USPC ........................................................ 710/110
See application file for complete search history.

(56) References Cited

U.S. PATENT DOCUMENTS

| | | | | |
|---|---|---|---|---|
| 2007/0091711 | A1* | 4/2007 | Wallner | G11C 8/18 365/233.14 |
| 2012/0272088 | A1* | 10/2012 | Lee | G06F 1/324 713/501 |
| 2014/0118372 | A1* | 5/2014 | Hung | G09G 3/2096 345/532 |
| 2015/0193297 | A1* | 7/2015 | Ngo | G06F 11/221 714/758 |
| 2015/0193298 | A1* | 7/2015 | Ngo | G06F 11/08 714/758 |
| 2015/0193321 | A1* | 7/2015 | Ngo | G06F 11/3027 714/758 |
| 2016/0173443 | A1* | 6/2016 | Hein | G06F 13/42 370/254 |

(Continued)

*Primary Examiner* — Henry Tsai
*Assistant Examiner* — Aurrangzeb Hassan
(74) *Attorney, Agent, or Firm* — Withrow & Terranova, P.L.L.C.

(57) ABSTRACT

The present disclosure relates to embodiments of bus interface systems capable of dealing with the tougher half clock cycle of SREAD commands in the new mobile industry processor interface (MIPI) radio frequency front end (RFFE) version 2.0 standard. With regard to the slave bus controllers of the bus interface systems disclosed herein, the slave bus controller is configured to operate the slave bus driver such that the data bus line is driven towards a minimum voltage level in response to a final clock edge of the clock signal during the bus park subframe. To ensure compliance with the MIPI RFFE version 2.0 standard, the slave bus controller is configured to detect when the data bus line has been driven within a first voltage range after the final clock edge and continue driving the data bus line 16 even after the bus park half clock period is finished.

20 Claims, 5 Drawing Sheets

(56) References Cited

U.S. PATENT DOCUMENTS

2017/0118125 A1* 4/2017 Mishra ................. H04L 47/193
2017/0192918 A1* 7/2017 Tenbroek .............. G06F 13/364

* cited by examiner

US 10,970,243 B2

FRONT END SERIAL BUS AUTOMATIC BUS PARK TRI-STATE ACTIVATION

RELATED APPLICATIONS

This application claims the benefit of provisional patent application Ser. No. 62/288,848, filed Jan. 29, 2016, the disclosure of which is hereby incorporated herein by reference in its entirety.

FIELD OF THE DISCLOSURE

This disclosure relates generally to bus interface systems for radio frequency (RF) front end systems.

BACKGROUND

Within the mobile industry processor interface (MIPI) radio frequency front end (RFFE) standards is a bus park mechanism/interval whereby the component currently driving a data bus line releases control of that line (by going into a tristate condition) and allows another component to take over driving the SDATA line. The new MIPI RFFE 2.0 standard continues with the use of half of a clock cycle for the current driver to drive the data bus line to a logic low and then tristate and thereby allow half of a clock cycle for the next driver to start driving the bus. It also continues with the concepts of half-speed data reads (HSDR) to simplify the RFFE bus slave requirements and adds the concept of synchronous READ (SREAD) commands. The purpose of the SREAD command is simply to further (i.e., relax) the bus slave driver requirements. An SREAD command allows for the RFFE bus master (or masters) to sample the data bus line not on the falling edge of the serial clock (SCLK) but instead on the following rising clock edge. This gives bus slaves twice the time to change states. It is important to keep the RFFE bus slave devices with simple driving requirements. The slave drivers need to be sized big enough to support the maximum clock frequency but small enough to avoid and minimize electromagnetic interference and other signal integrity issues.

A problem exists, however, with the bus park at the end of the SREAD command. While the SDATA drives can be designed to meet the longer SREAD timelines, which allow for a full clock cycle to reach 80% of the reference supply rail, the bus park at the end of the data frame still only allows the RFFE bus slave half of a clock cycle to drive SDATA low and tristate the slave driver. While the portion of the SDATA driver can be designed to meet the tougher half clock cycle while allowing the rising portion to meet a full clock cycle, there is increased risk and concern regarding the faster fall times across all production, temperature, voltage, and load conditions.

Therefore, techniques and devices are needed that deal with the tougher half clock cycle of SREAD commands.

SUMMARY

The present disclosure relates to embodiments of bus interface systems capable of dealing with the tougher half clock cycle of synchronous READ (SREAD) commands in the new mobile industry processor interface (MIPI) radio frequency front end (RFFE) version 2.0 standard. The bus interface system includes a master bus controller and at least one slave bus controller. The master bus controller is configured to generate a clock signal and implement a read data frame along a data bus line. The slave bus controller is operable to receive the clock signal. Furthermore, the slave bus controller includes a slave bus driver that drives the data bus line. In this manner, the slave bus controller is configured to generate an input data signal along the data bus line during the read data frame and end the read data frame during a bus park subframe of the read data frame. When the input data signal on the data bus line has been driven to a high voltage state by the slave bus driver prior to the bus park subframe, the slave bus controller is configured to operate the slave bus driver such that the data bus line is driven towards a minimum voltage level in response to a final clock edge of the clock signal during the bus park subframe. To ensure that the tougher half clock cycle of SREAD commands in the new MIPI RFFE version 2.0 standard are met, the slave bus controller is configured to detect when the data bus line has been driven within a first voltage range after the final clock edge. The first voltage range is between a maximum voltage level and the minimum voltage level of the slave bus driver. Once the data bus line has been driven within the first voltage range after the final clock edge, the slave bus controller is configured to tristate the slave bus driver after a time delay interval after the final clock edge of the bus park subframe. In this manner, the slave bus controller is configured to tristate the slave bus driver while complying with the tougher half clock cycle of SREAD commands in the MIPI RFFE version 2.0 standard.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
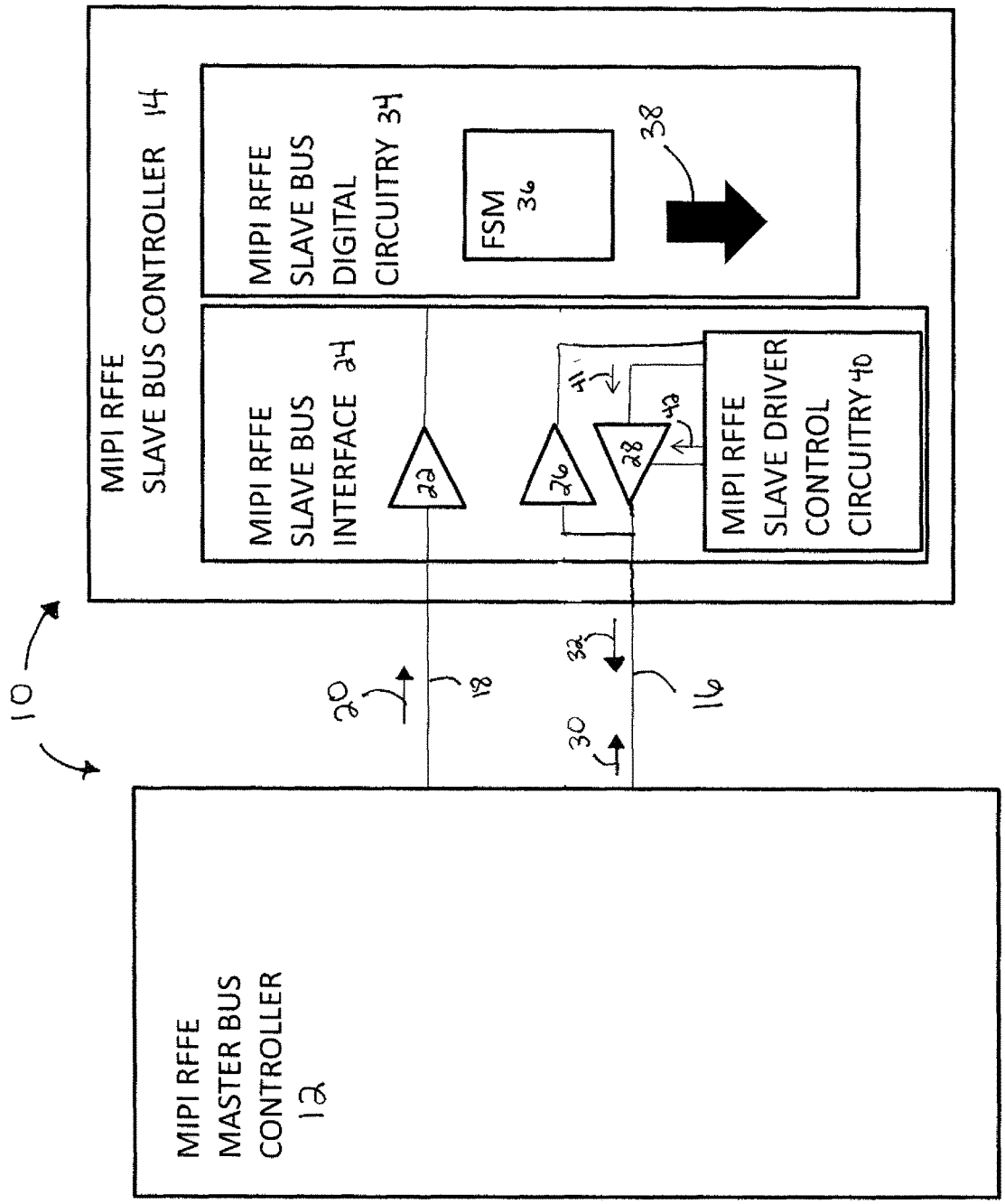
FIG. 1 illustrates an embodiment of a bus interface system in accordance with this disclosure that includes a master bus controller and slave bus controller.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 illustrates one embodiment of a bus interface system 10 in accordance with this disclosure. The bus interface system 10 includes a master bus controller 12 and a slave bus controller 14. It should be noted that in alternative embodiments the bus interface system 10 may include any number of slave bus controllers, like the slave bus controller 14 shown in FIG. 1. In this embodiment, the master bus controller 12 is a mobile industry processor interface (MIPI) radio frequency front end (RFFE) master bus controller, and the slave bus controller 14 is a MIPI RFFE slave bus controller. More specifically, the master bus controller 12 and the slave bus controller 14 are configured to comply with MIPI RFFE version 2.0 standards.

To communicate data between the master bus controller 12 and the slave bus controller 14, the master bus controller 12 and the slave bus controller 14 are connected by a data bus line 16 and a clock bus line 18. To synchronize data transmission, the master bus controller 12 is configured to generate a clock signal 20. The slave bus controller 14 is operable to receive the clock signal 20 along the clock bus line 18. In this embodiment, the slave bus controller 14 includes a clock driver 22 that receives the clock signal 20 from the clock bus line 18. Furthermore, the slave bus controller 14 operates at a higher voltage levels than the master bus controller 12, and the clock driver 22 thus adjusts the voltage levels of the clock signal 20 so that the clock signal 20 is provided to the slave bus controller 14 at the appropriate voltage levels.

The slave bus controller 14 includes a slave bus interface 24 that includes the clock driver 22, a detector 26, and a slave bus driver 28. The master bus controller 12 is configured to generate an input data signal 30 that is received by the slave bus controller 14 along the data bus line 16. In this manner, the master bus controller 12 is configured to transmit data pulses along the data bus line 16 to the slave bus controller 14. The detector 26 is provided so that the slave bus controller 14 is configured to detect when the data bus line 16 is within a voltage range, as explained in further detail below. Generally, the master bus controller 12 transmits data pulses in the input data signal 30 along the data bus line 16. In this manner, the input data signal 30 is formatted in accordance with a pulse amplitude modulation (PAM) to represent the different bit values in the manner described by the MIPI RFFE version 2.0 standard. Furthermore, the data pulses are synchronized in accordance with the clock signal 20. More specifically, every clock cycle of the clock signal 20 corresponds to a different bit and bit value being transmitted along the data bus line 16.

The slave bus interface 24 includes the slave bus driver 28 within the slave bus interface 24. The slave bus driver 28 is configured to drive the data bus line 16 for the slave bus controller 14. In this manner, the slave bus controller 14 is configured to generate an input data signal 32 along the data bus line 16. In particular, the slave bus driver 28 generates the input data signal 32 along the data bus line 16 during a read data frame. As such, the slave bus controller 14 responds to requests from the master bus controller 12 for data from the slave bus controller 14.

Thus, the slave bus controller 14 is configured to drive the data bus line 16 with the slave bus driver 28 to generate the input data signal 32. The master bus controller 12 is configured to transmit the clock signal 20 to the slave bus controller 14 so that the read data frame is synchronized in accordance with the clock signal 20. As shown in FIG. 1, the slave bus controller 14 includes slave bus digital circuitry 34, which in this embodiment is MIPI RFFE slave bus digital circuitry. The slave bus digital circuitry 34 includes a finite state machine (FSM) 36. The FSM 36 is configured to operate the slave bus driver 28 so that the slave bus driver 28 generates the input data signal 32 in accordance with the MIPI RFFE version 2.0 standard.

In particular, the FSM 36 is configured to operate the slave bus driver 28 by generating a slave drive output 38. The slave drive output 38 is received by slave driver control circuitry 40, which in this example is MIPI RFFE slave driver control circuitry. The slave driver control circuitry 40 thereby generates a slave drive signal 41 in either a high voltage state or a low voltage state depending on the bit value being transmitted along the data bus line 16. In turn, this results in the slave bus driver 28 driving the data bus line 16 so as to provide the input data signal 32 in a corresponding high voltage state or low voltage state depending on the bit value being transmitted along the data bus line 16. Accordingly, the input data signal 32 will include data pulses formatted in accordance with the PAM to represent different bit values in the manner described by the MIPI RFFE version 2.0 standard. FSM 36 is configured to synchronize these data pulses of the input data signal 32 in accordance with the clock signal 20 transmitted from the master bus controller 12.

Within the MIPI RFFE standard version 2.0 standard is a bus park subframe that transfers control of the data bus line 16 between the master bus controller 12 and the slave bus controller 14. In particular, the slave bus controller 14 is configured to end the read data frame during a bus park subframe whereby the slave bus driver 28 driving the data bus line 16 releases control of the data bus line 16 (by tristating) and allows another component, such as the master bus controller 12 to take over driving the data bus line 16. In particular, the slave driver control circuitry 40 is configured to generate a bus driver control signal 42. The bus driver control signal 42 is in a bus driving state so that the slave bus driver 28 drives the data bus line 16. However, the bus driver control signal 42 is in a tristate state so that the slave bus driver 28 tristates and thus gives up control of the data bus line 16 to the master bus controller 12.

If the slave bus driver 28 does not drive the data bus line 16 to below 20% of the maximum rail voltage (typically referred to as VIO in the MIPI RFFE standard, which is the reference voltage supply for MIPI RFFE buses) before the slave bus driver 28 tristates, the conditions required by the RFFE standard 2.0 are not met to ensure that the start of the next command is detected. The slave bus controller 14 shown in FIG. 1 ensures that data bus line reaches below 20% VIO before a Sequence Start Condition (SSC) begins the next data frame. The slave bus controller 14 does this despite the master bus controller 12 having an effective pull down resistance of approximately 200 kiloohms or greater. As described below, the slave driver control circuitry 40 does this by being configured to continue driving the data bus line 16 even after the bus park half clock period is finished.

More specifically, in the previous subframe to the bus park subframe (which ends the read data frame), the input data signal 32 may be provided in a high voltage state or in a low voltage state depending on whether the bit value represented in the previous subframe is a logic "1" or a logic "0" respectively. When the input data signal 32 on the data bus line 16 has been driven to a high voltage state by the slave bus driver 28 prior to the bus park subframe, the FSM 36 is configured to operate the slave bus driver 28 such that the data bus line 16 is driven towards a minimum voltage level in response to a final clock edge of the clock signal during the bus park subframe. In this embodiment, the minimum voltage level is approximately at ground. With the detector 26, the slave driver control circuitry 40 is configured to detect when the data bus line 16 has been driven within a voltage range after the final clock edge. The voltage range in this case is between approximately 60% of the maximum voltage level (i.e., the maximum rail voltage) and 30% of the maximum voltage level. The slave driver control circuitry 40 is configured to tristate the slave bus driver 28 after a time delay interval in response to detecting that the data bus line 16 has been driven within the voltage range after the final clock edge. When the input data signal 32 has been driven to a low voltage state by the slave bus driver 28 prior to the bus park subframe, the slave driver control circuitry 40 is configured to tristate the slave bus driver after the time delay interval in response to the final clock edge.

Figure 2:
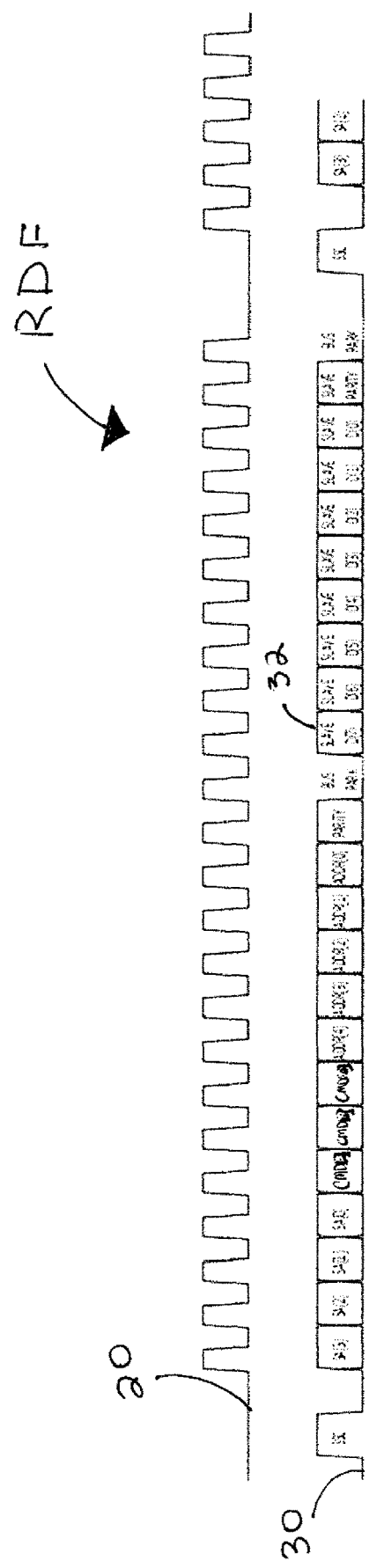
FIG. 2 illustrates an embodiment of a read data frame as provided by the bus interface system shown in FIG. 1.

Referring now to FIG. 1 and FIG. 2, FIG. 2 illustrates an embodiment of a read data frame RDF where the master bus controller 12 is requesting to read data from the slave bus controller 14. FIG. 2 illustrates the clock signal 20 generated by the master bus controller 12 along the clock bus line 18 to the slave bus controller 14 to synchronize the read data frame RDF. Also, as shown in FIG. 2, the read data frame RDF beings with a read command frame 44 with the master bus controller 12 generating a set of data pulses in the input data signal 30 to communicate that the master bus controller 12 is requesting to read data from the slave bus controller 14. The master bus controller 12 is configured to start of a command the read command frame 44 with an SSC. During the SSC, the master bus controller 12 is configured to generate the input data signal 30 to a logic "1" while maintaining the clock signal 20 logic "0." The temporal length of the SSC is approximately equal to two clock cycles although the clock signal 20 remains at logic "0" the entire time.

The master bus controller 12 is configured to generate clock pulses in the clock signal 20 throughout the remainder of the read command frame 44. In this case, the master bus controller 12 is configured to provide a slave identifier subframe. During the slave identifier subframe and the next four clock cycles of the clock signal 20, the master bus controller 12 is configured to generate four data pulses SA[3], SA[2], SA[1], SA[0], which represent bits of a slave identifier describing which slave bus controller the message is directed to. In this case, the four data pulses SA[3], SA[2], SA[1], SA[0] represent bits that identify the slave bus controller 14. As such, the FSM 36 of the slave bus controller 14 is configured to determine that the read data frame RDF is directed to it and not another slave bus controller.

Next, the master bus controller 12 is configured to provide a command identifier subframe. During the command identifier subframe and the next three clock cycles of the clock signal 20, the master bus controller 12 is configured to generate three data pulses CMD[2], CMD[1], CMD[0], which represent bits that identify the type of command. In this case, the bits CMD[2], CMD[1], CMD[0] identify the message as a read command. As such, the FSM 36 of the slave bus controller 14 is configured to determine that the read data frame RDF is a read command from the master bus controller 12.

After the command identifier subframe, the master bus controller 12 is configured to provide address subframe. During the address subframe and the next five clock cycles of the clock signal 20, the master bus controller 12 is configured to generate five data pulses ADDR[4], ADDR [3], ADDR [2], ADDR [1], ADDR [0], which represent bits that identify a memory address where the data that the master bus controller 12 is requesting is stored. As such, the FSM 36 of the slave bus controller 14 is configured to request the data word stored at the memory address identified by the bits ADDR[4], ADDR [3], ADDR [2], ADDR [1], ADDR [0] during the address subframe.

During the next clock cycle, the master bus controller 12 is configured to provide a data pulse representing a parity bit. The master bus controller 12 is configured to generate the parity bit based on a parity algorithm based on the bits of the slave identifier, the command subframe, the address subframe. The master bus controller 12 then ends the read command frame 44 with a bus park subframe where the master bus controller 12 holds the data bus line at a minimum voltage level for a clock cycle.

Next, the slave bus controller 14 is configured to decode the parity bit and determine whether decoded bits decoded from the slave identifier subframe, the command subframe, the address subframe are correct. If so, the slave bus controller 14 is configured to respond to the read command frame 44. More specifically, the FSM 36 of slave bus controller 14 is configured to control the slave bus driver 28 so that the slave bus driver 28 generates the input data signal 32 with eight data pulses D[7], D[6], D[5], D[4], D[3], D[2], D[1], D[0], which represents bits of the data word that was requested by the master bus controller, which in this case is a read command. The FSM 36 of the slave bus controller 14 is then configured to end the read data frame with the bus park subframe.

As shown in FIG. 2, in the subframe directly before to the bus park subframe that ends the read data frame, the input data signal 32 may be provided in a high voltage state or in a low voltage state depending on whether the bit value represented in the previous subframe is a logic "1" or a logic "0" respectively. When the input data signal 32 on the data bus line 16 has been driven to a high voltage state by the slave bus driver 28 prior to the bus park subframe, the FSM 36 is configured to operate the slave bus driver 28 such that the data bus line 16 is driven towards a minimum voltage level in response to a final clock edge of the clock signal 20 during the bus park subframe. With the detector 26, the slave driver control circuitry 40 is configured to detect when the data bus line has been driven within a voltage range after the final clock edge. The voltage range in this case is between approximately 60% of the maximum voltage level (i.e., the maximum rail voltage) and 30% of the maximum voltage level. The slave driver control circuitry 40 is configured to tristate the slave bus driver 28 after a time delay interval in response to detecting that the data bus line 16 has been driven within the voltage range after the final clock edge.

However, when the input data signal 32 has been driven to a low voltage state by the slave bus driver 28 prior to the bus park subframe, the slave driver control circuitry 40 is configured to tristate the slave bus driver 28 after the (same) time delay interval in response to the final clock edge. During the bus park subframe, the slave bus driver 28 drives the data bus line 16 below 20% of the maximum rail voltage (typically referred to as VIO in the MIPI RFFE standard version 2.0) before the slave bus driver 28 tristates and thereby give up control of the data bus line 16 for the next data frame. This ensures that the next SSC is detected. The time from when the bus park subframe ends until the start of the next SSC is a minimum of 10 ns. The FSM 36 of the slave bus controller 14 does this by continuing to drive SDATA even after the half clock cycle during the bus park subframe.

It should be noted that the bus interface system 10 is configured to support both READ commands and half-speed data command [SREAD] commands. During READ commands, the master bus controller 12 is configured to sample the input data signal 32 on the data bus line 16 of the slave bus controller 14 during each falling clock edge of the clock signal 20. However, during an SREAD command, the master bus controller 12 is configured to sample the input data signal 32 on the data bus line 16 on the following rising clock edge of the clock signal 20. This highlights the importance of the slave bus controller 14 being able to gain additional time to tristate the data bus line 16. Since the input data signal 32 may not be below 20% by the falling clock edge of the clock signal 20 during the bus park subframe, the slave bus driver 28 must be driven for longer period of time. Because the requirements are that the slave bus driver 28 pull down the data bus line 16 to 20% VIO within 25 ns of the 50% VIO point on the rising edge of clock signal 20, the slave bus driver will reach 20% VIO when driving the data bus line 16 before the maximum allowed time (defined by the MIPI RFFE version 2.0 standard) for the bus park subframe that ends the read data frame. This time period is approximately 29.9 ns in the worst case. Thus, this slave bus driver 28 is configured to release the data bus line 16 before the MIPI RFFE version 2.0 standard requires the pull down. The challenge is that simple MIPI slave bus controllers, such as the slave bus controller 14 shown in FIG. 1 do not generally have internal clocks or timers, so they use (falling or rising) clock edges of the clock signal 20 to know when to do various tasks.

Figure 3:
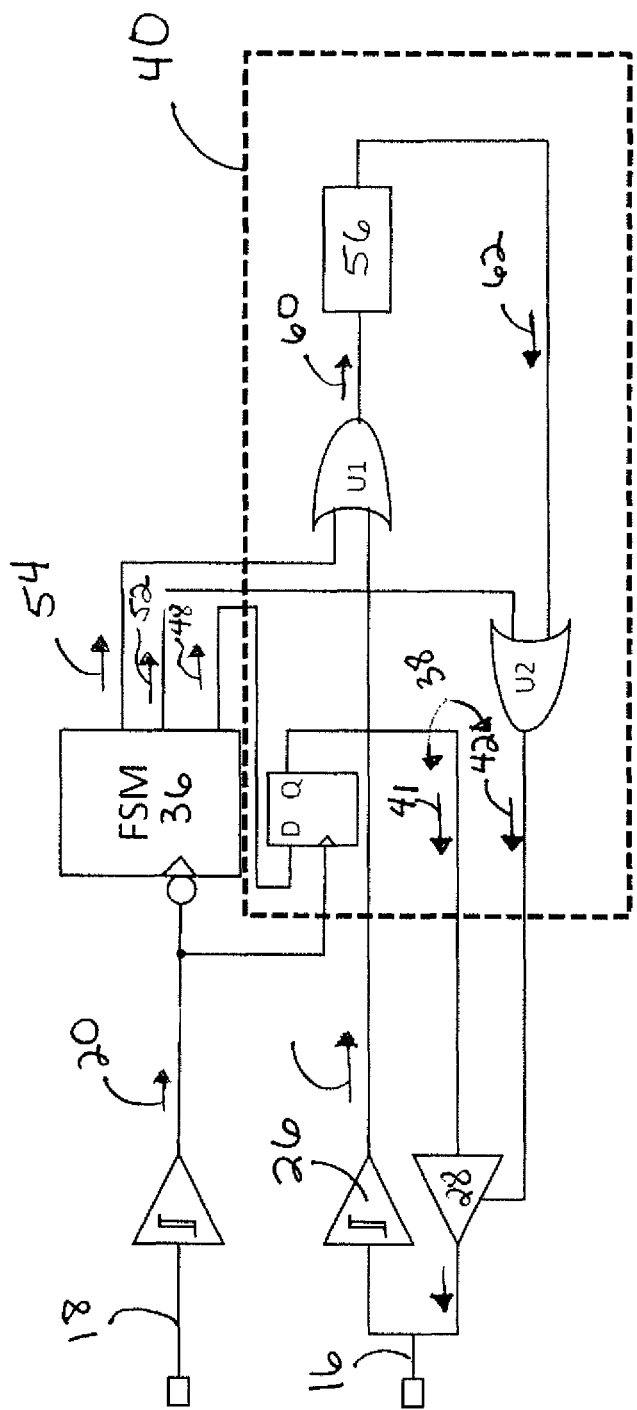
FIG. 3 illustrates an embodiment of the slave bus controller shown in FIG. 1.

FIG. 3 illustrates one embodiment of the slave bus interface 24 and the FSM 36 shown in FIG. 1. In particular, FIG. 3 illustrates an embodiment of the slave driver control circuitry 40 shown in FIG. 1. As shown in FIG. 3, the slave bus interface 24 includes the clock driver 22 that is connected to the clock bus line 18 and configured to provide the clock signal 20 to the FSM 36 from the master bus controller 12. The clock driver 22 is configured to provide the clock signal 20 from the master bus controller 12 at the appropriate voltage level and thereby allows the FSM 36 to synchronize a data frame, such as the read data frame shown in FIG. 2 in accordance with the clock signal 20.

Additionally, the slave bus interface 24 includes an embodiment of the detector 26. In this embodiment, the receive detector 26 is configured to provide the input data signal 30 to the slave driver control circuitry 40 at the appropriate voltage level. As explained above with regards to FIG. 1, the slave driver control circuitry 40 shown in FIG. 3 is configured to generate the slave drive signal 41 in either a high voltage state or a low voltage state depending on the bit value being transmitted along the data bus line 16. In this embodiment, the slave driver control circuitry 40 includes a flip flop 46. The FSM 36 is configured to generate a data signal 48 that is in a high voltage state to represent a logic "0" and a logic "1" to represent a logic "0." The flip flop 46 is configured to receive the data signal 48 at a data terminal. By generating the data signal 48, the FSM 36 determines what bit value is to be transmitted to the master bus controller 12. Thus, for example, the data pulses D[7]-D[0] are determined depending on whether the FSM 36 generates the data signal 48 in a high voltage state or in a low voltage state. The flip flop 46 also receives the clock signal 20 from the clock driver 22. In this embodiment, the flip flop 46 is configured to generate a slave drive signal 41 based on the data signal 48 from the FSM 36. The flip flop 46 is synchronized in accordance with the clock signal 20 and thus whether the slave drive signal 41 is provided in same voltage state as the data signal 48 is coordinated by the clock signal 20.

More specifically, the flip flop 46 is transparent and configured to set up the slave drive signal 41 to be in the same voltage state as the data signal 48 while the clock signal 20 is in the high voltage state and thus at logic "1." In contrast, the flip flop 46 is opaque and thus configured to hold the voltage level of slave drive signal 41 while the clock signal 20 is in the low voltage state and thus at logic "0." So long as the slave bus driver 28 is not tristated, the slave bus driver 28 generates a data pulse having the voltage level corresponding to the voltage level of the slave drive signal 41. Thus, while the slave bus driver 28 is not tristated, the slave bus driver 28 generates the input data signal 32 in a high voltage state in response to the slave drive signal 41 being in a high voltage state. Furthermore, while the slave bus driver 28 is not tristated, the slave bus driver 28 generates the input data signal 32 in a low voltage state in response to the slave drive signal 41 being in a low voltage state. The slave bus driver 28 is configured to provide the input data signal 32 at the voltage levels required by the master bus controller 12 along the bus line.

As discussed above, the slave driver control circuitry 40 is configured to generate the bus driver control signal 42. The bus driver control signal 42 is in a bus driving state so that the slave bus driver drives the data bus line 16. In this example, the bus driving state is a high voltage state. However, the bus driver control signal is in a tristate state so that the slave bus driver 28 tristates and thus gives up control of the data bus line 16 to the master bus controller 12 so that the master bus controller 12 can again control the data bus line 16. In this embodiment, the tristate state is a low voltage state. When the input data signal 32 on the data bus line 16 has been driven to a high voltage state by the slave bus driver 28 prior to the bus park subframe, the FSM 36 is configured to operate the slave bus driver 28 such that the data bus line 16 is driven towards a minimum voltage level in response to a final clock edge of the clock signal during the bus park subframe. In this embodiment, the minimum voltage level is approximately at ground.

With the detector 26, the slave driver control circuitry 40 is configured to detect when the data bus line 16 has been driven within a voltage range after the final clock edge. The voltage range in this case is between approximately 60% of the maximum voltage level (i.e., the maximum rail voltage) and 30% of the maximum voltage level. The FSM 36 is configured to tristate the slave bus driver 28 after a time delay interval in response to detecting that the data bus line 16 has been driven within the voltage range after the final clock edge of the bus park subframe (See FIG. 2). When the input data signal 32 has been driven to a low voltage state by the slave bus driver 28 prior to the bus park subframe, the FSM 36 is configured to tristate the slave bus driver after the time delay interval in response to the final clock edge (See FIG. 2). In the implementation shown in FIG. 2, the final clock edge of the bus park subframe is a final falling clock edge of the clock signal 20. The final falling clock edge of the clock signal 20 is provided during the bus park subframe where the slave bus controller 14 end the read data frame.

Figure 4:
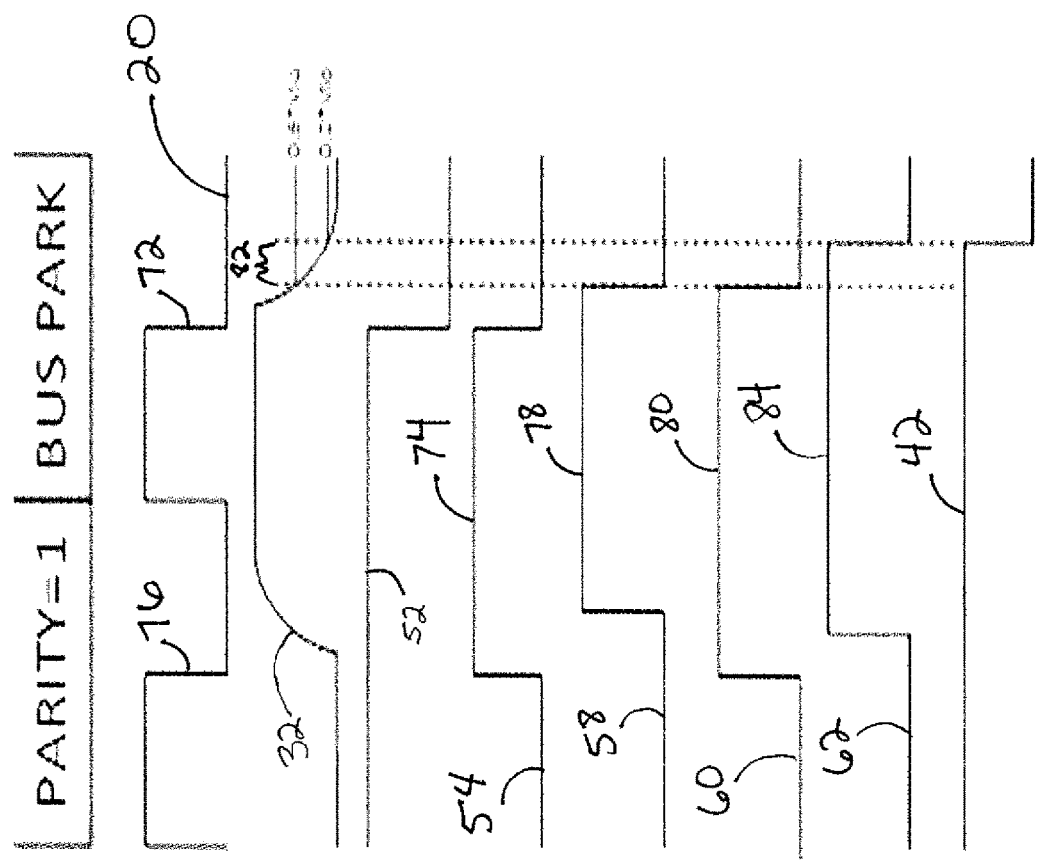
FIG. 4 is a signal diagram illustrating the operation of the slave bus controller shown in FIG. 3 when a data bus line is driven to a high voltage state prior to a bus park subframe.

To do this, the FSM 36 is configured to generate the slave drive output 38 such that the slave drive output 38 includes a final clock edge detection signal 52 and a clock interval signal 54 and as explained in further detail below. The slave driver control circuitry 40 further includes an OR gate U1, an OR gate U2, and a timer delay element 56. The detector 26 is configured to generate a first detection signal 58 that is in a high voltage state whenever the data bus line 16 is above the voltage range and in a low voltage state whenever the data bus line 16 is in the voltage range and below the voltage range. As shown in FIG. 4, the OR gate U1 is configured to receive the first detection signal 58 at one input terminal and receive the clock interval signal 54 at the other input terminal. As explained in further detail below, the OR gate U1 is configured to generate an intermediary detection signal 60 that indicates when the data bus line 16 has been driven into the voltage range during the bus park subframe. Also, as explained in further detail below, the intermediary detection signal 60 is received by the timer delay element 56. The timer delay element 56 is configured to provide the time delay interval and thus is configured to generate a delay intermediary detection signal 62 that is delayed by the time delay interval with respect to the intermediary detection signal 60. The OR gate U2 is configured to receive the final clock edge detection signal 52 at one input terminal and the delay intermediary detection signal 62 at the other input terminal. The OR gate U2 is configured to generate the bus driver control signal 42 that is received by the slave bus driver 28.

Referring now to FIG. 3 and FIG. 4, FIG. 4 illustrates the operation of the slave driver control circuitry 40 shown in FIG. 3 when the input data signal 32 on the data bus line 16 has been driven to a high voltage state by the slave bus driver 28 prior to the bus park subframe. In particular, the slave bus driver 28 has generated a data pulse 70 that represents the parity bit as a logical "1" and thus the input data signal 32 is driven to the maximum voltage level (i.e. the maximum rail voltage) and thus is in the high voltage state at the beginning of the bus par subframe. The FSM 36 is configured to switch the final clock edge detection signal 52 from a high voltage state to a low voltage state in response to a final falling clock edge 72 of the clock signal 20 during the bus park subframe. During the final clock pulse during the bus park subframe, the FSM 36 is configured to generate the data signal 48 so that the flip flop generates the slave drive signal 41 in the low voltage state. Accordingly, the slave driver control circuitry 40 is configured to drive the data bus line 16 toward the minimum voltage level (e.g., ground) in response to the final clock edge. Furthermore, the FSM 36 is configured to generate the clock interval signal 54 to have a clock interval pulse 74 during a clock interval between a second to last falling clock edge 76 (which occurs during the previous subframe for the parity bit) and the final falling clock edge 72. Also, the detector 26 is configured to generate the first detection signal 58 with a detection pulse 78 that indicates when the data bus line 16 is provided so long as the data bus line 16 is above the voltage range.

Accordingly, the OR gate U1 is configured to generate the intermediary detection signal 60 with a detection pulse 80 that extends from the second to last falling clock edge 76 until the data bus line 16 has been driven into the voltage range. The timer delay element 56 is configured to receive the intermediary detection signal 60 and generate the delay intermediary detection signal 62 such that the delay intermediary detection signal 62 is delayed by a time delay interval 82. Thus, the delay intermediary detection signal 62 also includes a detection pulse 84 that is delayed with respect to the detection pulse 80 by the time delay interval 82.

The OR gate U2 is configured to receive the final clock edge detection signal 52 and the delay intermediary detection signal 62 so as to generate the bus driver control signal 42. Thus, prior to the final clock edge 72, the OR gate U2 is configured to generate the bus driver control signal 42 in the bus driver state (in this case a high voltage state). However, the slave driver control circuitry 40 is configured to switch the bus driver control signal from the bus driving state to the tristate state (in this case, a low voltage state) once the detection pulse 84 ends. Accordingly, the slave driver control circuitry 40 is configured to tristate the slave bus driver 28 after the time delay interval 82 in response to detecting that the data bus line 16 has been driven within the voltage range after the final clock edge 72.

Figure 5:
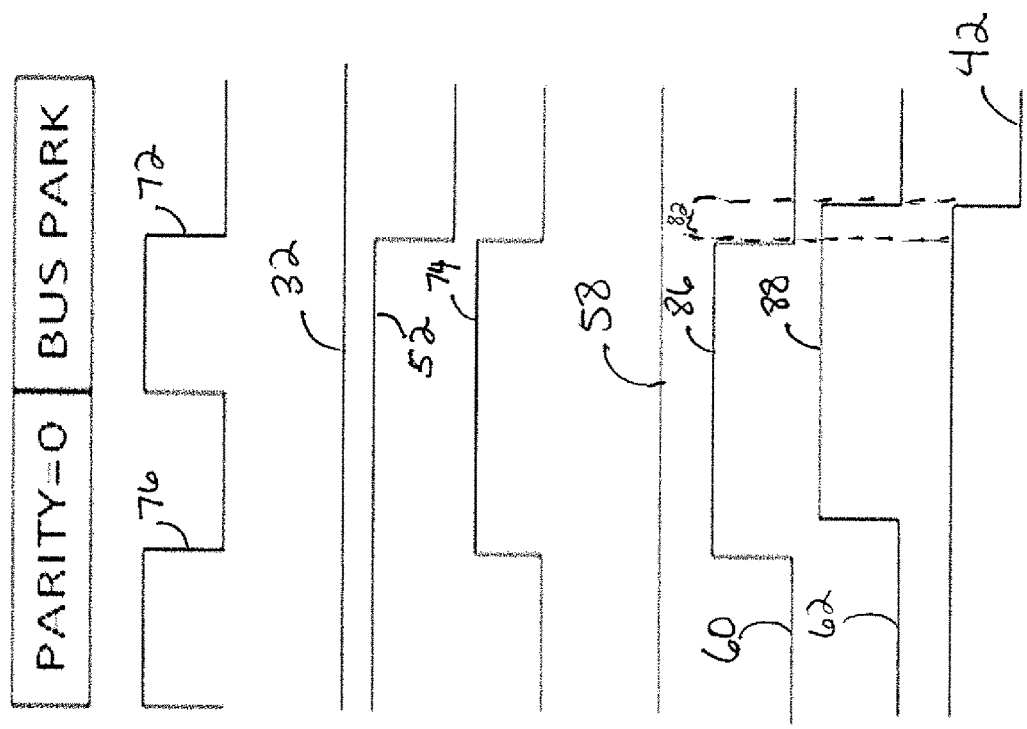
FIG. 5 is a signal diagram illustrating the operation of the slave bus controller shown in FIG. 3 when the data bus line is driven to a low voltage state prior to a bus park subframe.

Referring now to FIG. 3 and FIG. 5, FIG. 5 illustrates the operation of the slave driver control circuitry 40 shown in FIG. 3 when the input data signal 32 on the data bus line 16 has been driven to a low voltage state by the slave bus driver 28 prior to the bus park subframe. In particular, the slave bus driver 28 has been maintained in the low voltage state so that the parity bit is a logical "0" and thus the input data signal 32 is driven to the minimum voltage level (e.g., ground). Thus, the input data signal 32 is in the low voltage state at the beginning of the bus par subframe. During the final clock pulse in the bus park subframe, the FSM 36 is configured to generate the data signal 48 so that the flip flop 46 generates the slave drive signal 41 in the low voltage state. Accordingly, the slave driver control circuitry 40 is configured to drive the data bus line 16 toward the minimum voltage level (e.g., ground) in response to the final clock edge. However, the data bus line 16 is already at the minimum voltage level. As discussed above, the FSM 36 is configured to generate the clock interval signal 54 to have the clock interval pulse 74 during the clock interval between the second to last falling clock edge 76 (which occurs during the previous subframe for the parity bit) and the final falling clock edge 72. Since the data bus line 16 is maintained in the low voltage state, the detector 26 is configured to generate the first detection signal 58 without the detection pulse 78 (shown in FIG. 4).

Accordingly, the OR gate U1 is configured to generate the intermediary detection signal 60 with a detection pulse 86 that extends from the second to last falling clock edge 76 until the data bus line 16 until the final clock edge 72, just like the clock interval signal 54. The timer delay element 56 is configured to receive the intermediary detection signal 60 and generate the delay intermediary detection signal 62 such that the delay intermediary detection signal 62 is delayed by the time delay interval 82. Thus, the delay intermediary detection signal 62 also includes a detection pulse 88 that is delayed with respect to the detection pulse 80 by the time delay interval 82.

The OR gate U2 is configured to receive the final clock edge detection signal 52 and the delay intermediary detection signal 62 so as to generate the bus driver control signal 42. Thus, prior to the final clock edge 72, the OR gate U2 is configured to generate the bus driver control signal 42 in the bus driver state (in this case a high voltage state). However, the slave driver control circuitry 40 is configured to switch the bus driver control signal 42 from the bus driving state to the tristate state (in this case, a low voltage state) once the detection pulse 88 ends. Accordingly, the slave driver control circuitry 40 is configured to tristate the slave bus driver 28 after the time delay interval 82 in response to the final clock edge 72.

Those skilled in the art will recognize improvements and modifications to the preferred embodiments of the present disclosure. All such improvements and modifications are considered within the scope of the concepts disclosed herein and the claims that follow.

What is claimed is:

1. A bus interface system, comprising:
a master bus controller configured to generate a clock signal and implement a read data frame; and
a slave bus controller operable to receive the clock signal, the slave bus controller comprising a slave bus driver that drives a data bus line, wherein the slave bus controller is configured to generate an input data signal during the read data frame and end the read data frame during a bus park subframe of the read data frame and wherein, when the input data signal, which is transmitted from the slave bus driver to the master bus controller along the data bus line, has been driven to a high voltage state by the slave bus driver prior to the bus park subframe, the slave bus controller is configured to:
operate the slave bus driver such that the data bus line is driven towards a minimum voltage level in response to a final clock edge of the clock signal during the bus park subframe;
detect when the data bus line has been driven within a first voltage range after the final clock edge during the bus park subframe, wherein the first voltage range is between a maximum voltage level and the minimum voltage level of the data bus line; and
tristate the slave bus driver, such that the slave bus driver gives up control of the data bus line to the master bus controller, after a time delay interval in response to detecting that the data bus line has been driven within the first voltage range after the final clock edge of the clock signal during the bus park subframe.

2. The bus interface system of claim 1 wherein when the input data signal has been driven to a low voltage state by the slave bus driver prior to the bus park subframe, and the slave bus controller is configured to tristate the slave bus driver after the time delay interval in response to the final clock edge.

3. The bus interface system of claim 1 wherein the slave bus controller is a mobile industry processor interface (MIPI) radio frequency front end (RFFE) slave bus controller.

4. The bus interface system of claim 3 wherein the master bus controller is a MIPI RFFE master bus controller.

5. The bus interface system of claim 1 wherein the first voltage range is between approximately 60% of the maximum voltage level and 30% of the maximum voltage level.

6. The bus interface system of claim 5 wherein the maximum voltage level is approximately a high rail voltage of the slave bus driver.

7. The bus interface system of claim 6 wherein the minimum voltage level is approximately at ground.

8. The bus interface system of claim 1 wherein the time delay interval provides sufficient time for the slave bus driver to drive the data bus line to a low enough bus level before a minimum amount of time until a next data frame so as to comply with mobile industry processor interface (MIPI) radio frequency front end (RFFE) version 2.0 specifications.

9. The bus interface system of claim 1 further comprising a clock bus line connected between the master bus controller and the slave bus controller, wherein the master bus controller is configured to transmit the clock signal to the slave bus controller so that the read data frame is synchronized in accordance with the clock signal.

10. The bus interface system of claim 5 wherein the slave bus controller further comprises:
a finite state machine (FSM) operable to receive the clock signal wherein the FSM is configured to synchronize the read data frame in accordance with the clock signal and generate a slave drive output to control the slave bus driver during the read data frame and detect when the data bus line has been driven within the first voltage range; and
slave driver control circuitry configured to operate the slave bus driver in accordance with the slave drive output so that the slave bus driver is tristated after the time delay interval in response to detecting that the data bus line has been driven within the first voltage range after the final clock edge.

11. The bus interface system of claim 10 wherein the slave driver control circuitry comprises a timer delay element configured to provide the time delay interval.

12. The bus interface system of claim 11 wherein the slave driver control circuitry is configured to generate a bus driver control signal, wherein the bus driver control signal is in a bus driving state so that the slave bus driver drives the data bus line and in a tristate state so that the slave bus driver tristates the data bus line.

13. The bus interface system of claim 12 wherein:
the FSM is configured to generate the slave drive output so that the slave drive output includes a detection signal and provide a first detection pulse in the detection signal while the data bus line is within the first voltage range; and
the timer delay element is configured to receive the detection signal and generate a delayed detection signal with a second detection pulse such that the second detection pulse is delayed by the time delay interval with respect to the first detection pulse.

14. The bus interface system of claim 13 wherein the slave bus controller is configured to switch the bus driver control signal from the bus driving state to the tristate state once the second detection pulse ends.

15. The bus interface system of claim 10 wherein the final clock edge is a final falling clock edge.

16. The bus interface system of claim 15 wherein the FSM is configured to generate the slave drive output that includes a clock interval signal so that the clock interval signal has a clock interval pulse during a clock interval between a second to last falling clock edge and the final falling clock edge and wherein the slave driver control circuitry is configured to tristate the slave bus driver after the time delay interval in response to the final clock edge.

17. The bus interface system of claim 16 wherein the input data signal has been driven to a low voltage state by the slave bus driver prior to the bus park subframe, the slave bus controller is configured to tristate the slave bus driver after the time delay interval once the clock interval pulse has finished.

18. The bus interface system of claim 1 wherein the master bus controller is configured to have an effective pull down resistance of approximately 200 kiloohms or greater.

19. A method of tristating a data bus line in a bus interface system, which includes a master bus controller and a slave bus controller connecting by the data bus line, comprising:
operating a slave bus driver in the slave bus controller such that the data bus line is driven towards a minimum voltage level in response to a final clock edge of a clock signal during a bus park subframe when an input data signal, which is transmitted from the slave bus driver to the master bus controller along the data bus line, has been driven to a high voltage state by the slave bus driver prior to the bus park subframe;
detecting, by the slave bus controller, when the data bus line has been driven within a first voltage range after the final clock edge during the bus park subframe, wherein the first voltage range is between a maximum voltage level and the minimum voltage level of the data bus line; and
tristating the slave bus driver by the slave bus controller, such that the slave bus driver gives up control of the data bus line to the master bus controller, after a time delay interval in response to detecting that the data bus line has been driven within the first voltage range after the final clock edge.

20. The method of claim 19 further comprising tristating the slave bus driver after the time delay interval in response to the final clock edge when the input data signal has been driven to a low voltage state by the slave bus driver prior to the bus park subframe.

* * * * *